US009809384B2

(12) United States Patent
Mountz et al.

(10) Patent No.: US 9,809,384 B2
(45) Date of Patent: Nov. 7, 2017

(54) INVENTORY SYSTEM WITH EFFICIENT OPERATOR HANDLING OF INVENTORY ITEMS

(71) Applicant: Amazon Technologies, Inc., Seattle, WA (US)

(72) Inventors: Michael Cordell Mountz, Lexington, MA (US); John Joseph Enright, Somerville, MA (US); Joseph W. Durham, Somerville, MA (US); Michael Harrison Decker, Concord, MA (US); Jonathan Harris Schechter, Cambridge, MA (US); Peter R. Wurman, Acton, MA (US); Eryk Brian Nice, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 14/552,334

(22) Filed: Nov. 24, 2014

(65) Prior Publication Data
US 2016/0145045 A1 May 26, 2016

(51) Int. Cl.
*G06F 7/00* (2006.01)
*B65G 1/137* (2006.01)
*G06Q 10/08* (2012.01)

(52) U.S. Cl.
CPC ......... *B65G 1/1378* (2013.01); *G06Q 10/087* (2013.01)

(58) Field of Classification Search
None
See application file for complete search history.

(56) References Cited

U.S. PATENT DOCUMENTS

| 3,825,130 | A | 7/1974 | Lapham et al. |
| 8,280,547 | B2 | 10/2012 | D'Andrea et al. |
| 8,311,902 | B2 | 11/2012 | Mountz et al. |
| 8,700,502 | B2 | 4/2014 | Mountz et al. |
| 8,798,784 | B1 * | 8/2014 | Clark ............ G06Q 10/08 198/431 |
| 8,825,197 | B1 * | 9/2014 | Guan ............ B65G 1/1371 700/213 |
| 2009/0074545 | A1 | 3/2009 | Lert, Jr. et al. |

(Continued)

OTHER PUBLICATIONS

U.S. Appl. No. 14/552,309, filed Nov. 24, 2014, Titled: Inventory System With Efficient Operator Handling of Inventory Items.

(Continued)

*Primary Examiner* — Yolanda Cumbess
(74) *Attorney, Agent, or Firm* — Kilpatrick Townsend & Stockton LLP

(57) ABSTRACT

An inventory system can include multiple floors. The system can assign operations involving inventory items to a floor based on information about the floor, other floors, the operations, and/or the inventory items. In one example, the system may assign an order to be assembled on a floor based on the floor containing items for the order. Items may be moved to the floor from other floors to complete the order. In another example, a receipt receptacle received from a shipping vehicle can be moved to a rack without separating inventory items from the receipt vehicle. A mobile drive unit can move the rack to a floor based on information known about the inventory items matching criteria about the floor.

19 Claims, 10 Drawing Sheets

(56) References Cited

U.S. PATENT DOCUMENTS

| | | |
|---|---|---|
| 2010/0262278 A1 | 10/2010 | Winkler et al. |
| 2012/0101627 A1 | 4/2012 | Lert et al. |
| 2012/0143427 A1* | 6/2012 | Hoffman .............. G06Q 10/087 701/23 |
| 2014/0188671 A1 | 7/2014 | Mountz et al. |
| 2014/0343713 A1* | 11/2014 | Ziegler ................. B65G 1/137 700/214 |

OTHER PUBLICATIONS

PCT/US15/062481, "International Search Report and Written Opinion," dated Feb. 8, 2016, 11 pages.

* cited by examiner

INVENTORY SYSTEM WITH EFFICIENT OPERATOR HANDLING OF INVENTORY ITEMS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to utilizing mobile drive units to facilitate efficient operator handling of inventory items being processed through an inventory system, which may be distributed across multiple contemporaneously-operating floors of a common workspace. In one example, cases of inbound inventory items from delivery vehicles can be loaded onto shuttles—without sorting the content of the cases—and moved by the mobile drive units to a holding area from which individual cases can be accessed and/or processed in a sequence that is not restricted to the sequence in which the cases were removed from the delivery vehicles. In another example, mobile drive units can be used to spread inventory among multiple vertically separated floors so that the floors can operate separately and collectively for efficient fulfillment of orders.

Figure 1:
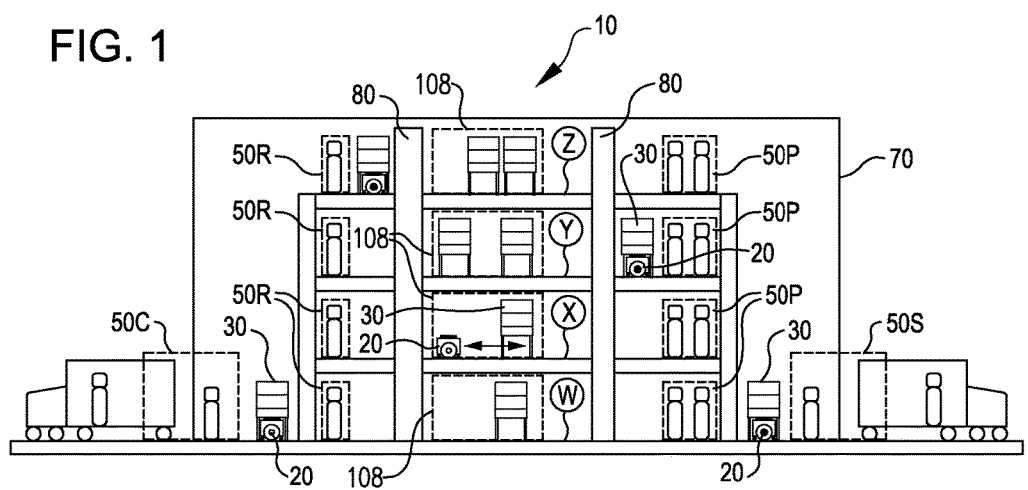
FIG. 1 illustrates an example of a multi-level inventory system according to a particular embodiment.

As an illustrative example showing these and other features, FIG. 1 illustrates an example of a multi-level inventory system 10 according to a particular embodiment. The inventory system 10 can include features described in greater detail beginning in FIG. 2 below. The inventory system 10 can utilize mobile drive units 20 to facilitate strategic operator interactions with inventory items passing through the inventory system 10. For example, the mobile drive units 20 can move inventory holders 30 loaded with items between different stations 50 at which operators may "touch" inventory items and prepare the inventory items for subsequent phases in the inventory system 10. The mobile drive units 20 may facilitate an efficient amount of touches and reduce a total number of touches and/or time consumed by touches. The system 10 can include stations 50 that facilitate strategic touches.

At a first, "check in" station 50C, inventory items can be checked into the inventory system 10. The items may arrive in boxes or other containers (hereinafter "cases" or "receipt receptacles") carried by trucks or other delivery vehicles. The cases can be loaded directly onto racks 30, e.g., case shuttles 32 (FIG. 7), at the check-in station 50C without any sortation of the items contained therein. In some embodiments, the cases may be scanned or otherwise identified during check-in. The racks with the cases of inventory items can be moved by mobile drive units 20 away from the check-in station 50C, such as to a storage area 108 on any level W, X, Y, or Z of the workspace 70. For example, the mobile drive unit 20 can move a rack 30 to a storage area 108 on a floor in order to improve a mix of inventory items on the floor based on the items known to be on the floor and the items known to be in the cases on the rack 30. Mobile drive units 20 can move racks 30 between levels W, X, Y, or Z of the workspace 70 using vertical conveyance mechanisms, e.g., elevators 80.

Figure 7:
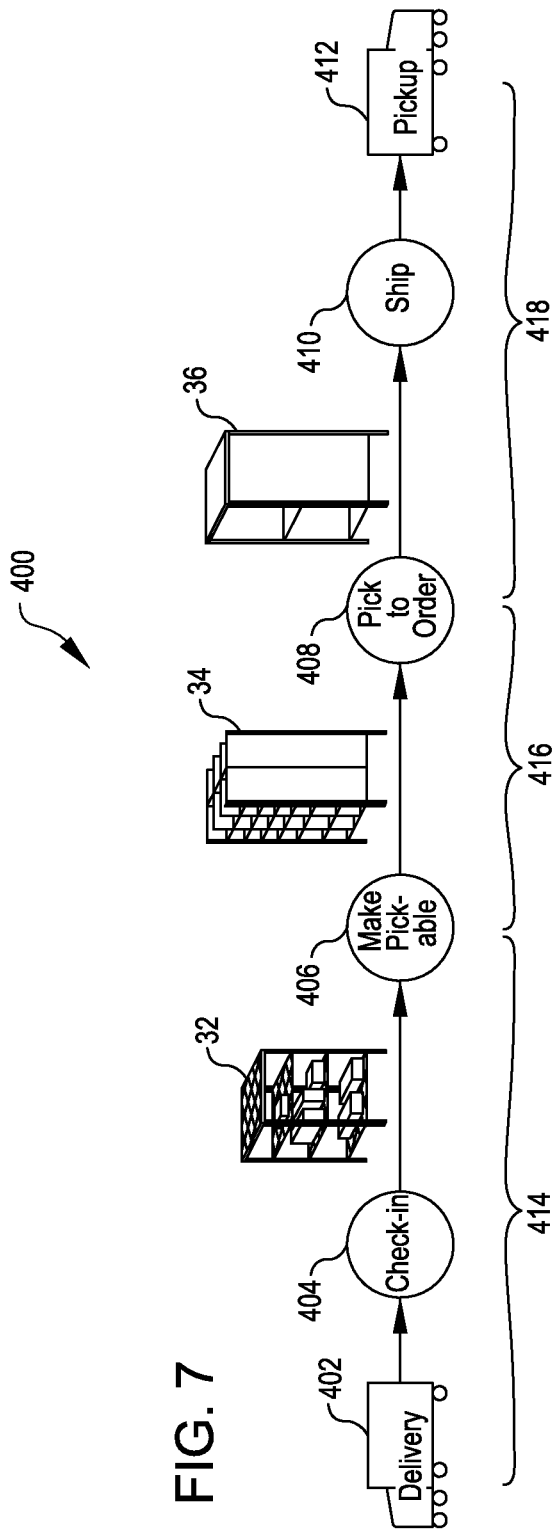
FIG. 7 is a process flow illustrating an example process that can be performed in the inventory system according to a particular embodiment.

A mobile drive unit 20 can move a rack 30 carrying cases of inventory items to any receiving station 50R on any floor W, X, Y, or Z, such as from a storage area 108 on any floor or from a check-in station 50C. In some embodiments, a rack 30 carrying cases may be moved to a receive station 50R in a different order than cases are loaded onto the rack. In some embodiments, the rack is not moved to the receive station 50R until an order is placed for an item in a case. At the receive station 50R, a case can be removed from the rack so that inventory items in the case can be sorted and placed into other racks 30, e.g., pickable inventory holders 34 (FIG. 7). Such a touch can make inventory items "pickable," e.g., ready to be picked from inventory holders 30 to fulfill orders. A mobile drive unit 20 can move a pickable inventory holder 30 away from the receive station 50R, such as to a storage area 108 on any one of the floors W, X, Y, or Z.

A mobile drive unit can move a pickable inventory holder 30 to a pick station 50P, such as from a storage area 108 on one of the levels, W, X, Y, or Z, and/or from a receive station 50R. At the pick station 50P, inventory items can be removed from the inventory holders, e.g., pickable inventory holders 34 and/or case shuttles 32, and then transferred into cases (such as order receptacles 514 or 514' (FIG. 11) that may be filled with items to fulfill orders) that are loaded onto further racks 30, e.g., order shuttles 36 (FIG. 7). Such a touch may switch inventory items from a pickable state directly to an assembled order state without any additional conveyance and/or touches for intermediate sorting and/or packing operations. Mobile drive unit 20 can move an inventory holder or other rack 30 with assembled orders from the pick station 50P, such as to a storage area 108 on any of the levels W, X, Y, or Z, and/or to a ship station 50S.

At the ship station 50S, orders can be transferred from a rack 30 into a delivery truck or other vehicle to transport the ordered items and their cases away from the building and to ultimate destinations.

Although FIG. 1 for the sake of clarity shows a uniform type of inventory holder 30 and a uniform type of mobile drive unit 20 throughout the various phases of the inventory system 10, in some embodiments, different types of mobile drive units 20 and/or different types of inventory holders 30 may be utilized in various phases. As an illustrative example, larger mobile drive units 20 with a greater lifting capacity may be utilized to handle inventory holders 30, e.g., case shuttles 32 and order shuttles 36, relative to check-in stations 50C and/or shipping stations 50S, and more agile, smaller mobile drive units 20 may handle inventory holders 30, e.g., pickable inventory holders 34, with respect to receiving stations 50R and/or pick stations 50P. In some embodiments, inventory holders 30 may be configured as— or replaced with—structures particularly suited for one or more specific phases, such as the case shuttles 32, pickable inventory holders 34, and/or order shuttles 36 described in greater detail below with respect to FIG. 7 and subsequent drawings.

Figure 2:
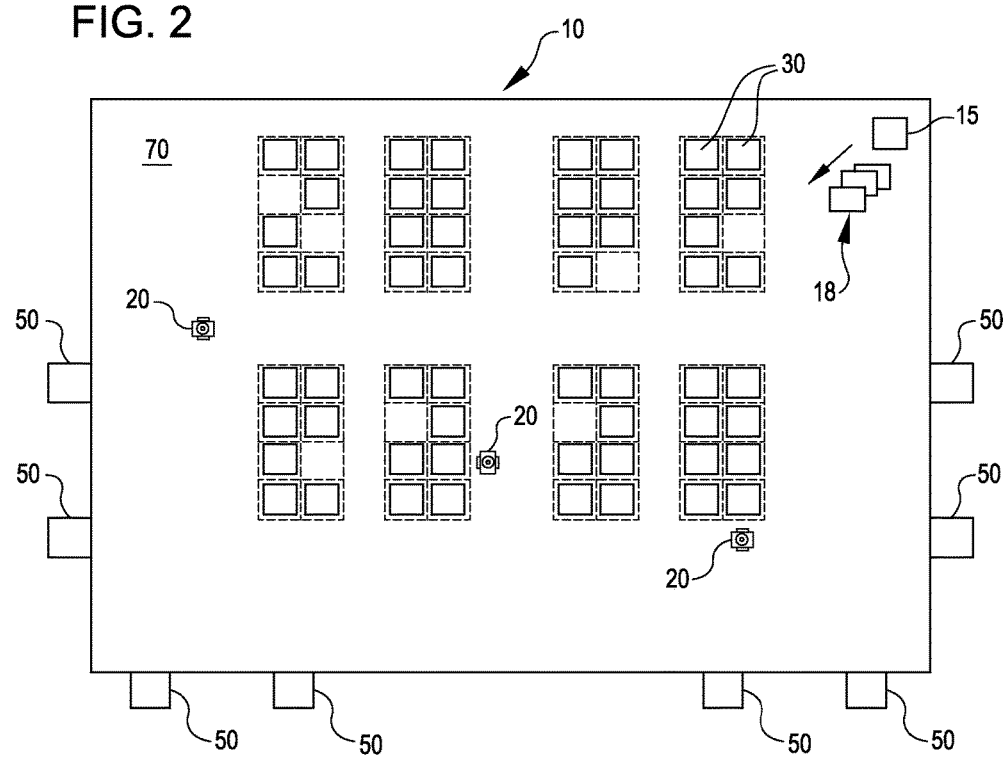
FIG. 2 illustrates components of an example of an inventory system according to a particular embodiment.

FIG. 2 illustrates the contents of an example of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
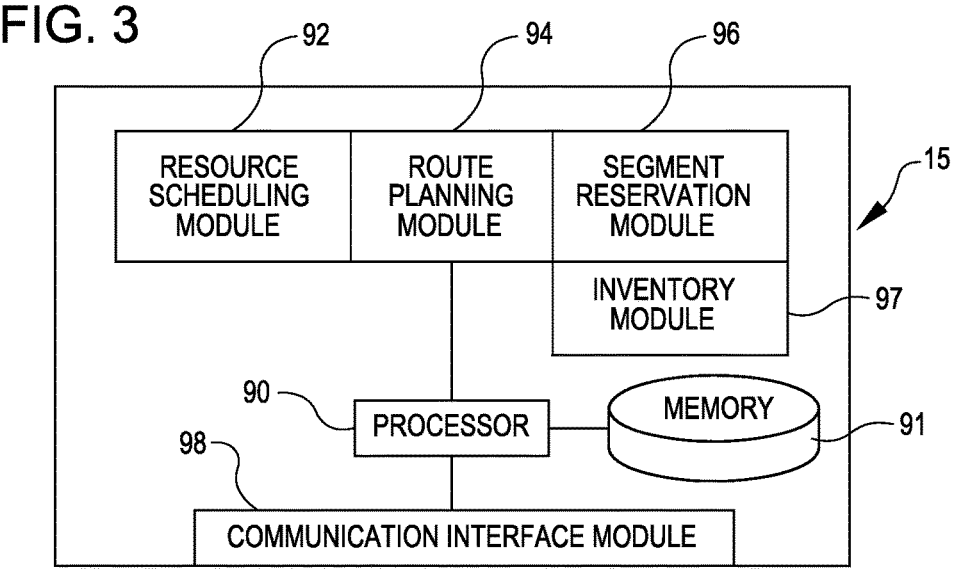
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
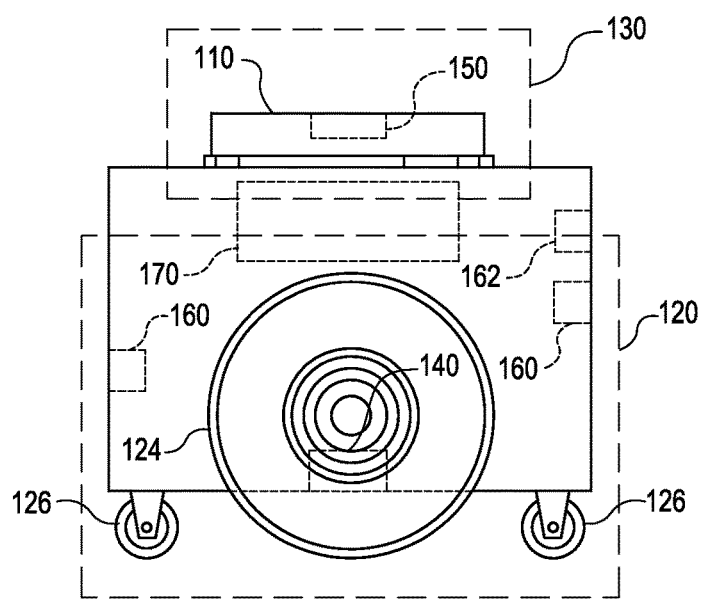
FIGS. 4 and 5 illustrate in greater detail an example mobile drive unit that may be utilized in particular embodiments of the inventory system shown in FIG. 2.
Figure 5:
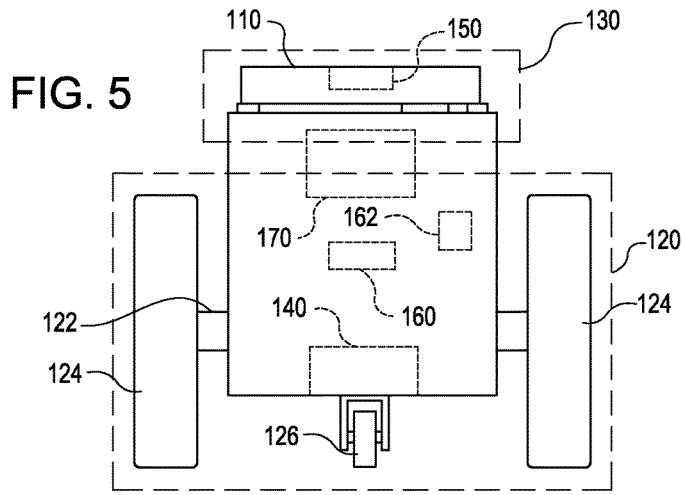

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
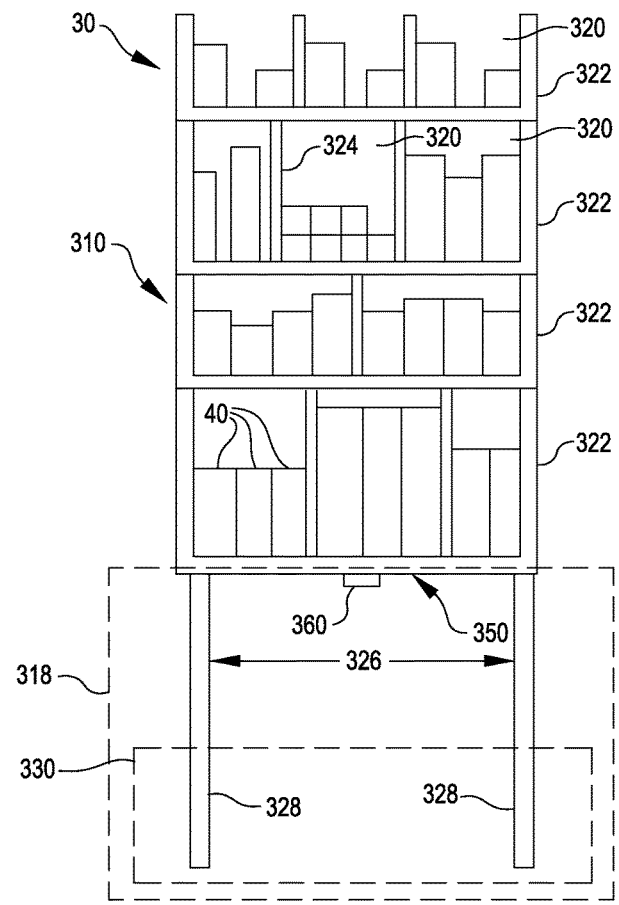
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to utilizing mobile drive units to facilitate efficient operator handling of inventory items being processed through an inventory system. FIG. 7 is a process flow illustrating an example process 400 that can be performed in the inventory system 10 according to a particular embodiment. At 402 in the process 400, a truck or other delivery vehicle arrives at a workspace 70. The truck may be carrying inventory items 40, which may be grouped into receptacles for the transit process. These receptacles (hereinafter, "receipt receptacles") may be cardboard boxes, plastic reusable containers, pallets, envelopes, or any other receptacle capable of containing single or multiple items. For example, the cases described above with respect to FIG. 1 are an example of receipt receptacles.

At 404, a "check-in operation" or touch is performed. Examples of check-in stations 50C, 550C at which the check-in operation 404 can be performed are described above with respect to FIG. 1 and below with respect to FIGS. 8 and 9. In the check-in operation, the receipt receptacles are moved from the delivery vehicle onto case shuttles 32. Case shuttles 32 may be any holder, including inventory holders 30 configured to receive receipt receptacles. The receipt receptacles can be loaded without any sortation of the receipt receptacles or the inventory items contained therein, such as by operators or by automation. As an example, the check-in operation may involve transferring the receipt receptacles by hand, conveyor, fork lift, robotic device, or other method onto case shuttles 32. As part of the check-in operation, identification information of a receipt receptacle, such as a serial number or other tracking identification can be correlated with the case shuttle 32 onto which the receipt receptacle was placed. The information can be correlated using bar scanners, radio frequency identification, or other identification methods. Such a correlation may be stored, such as in memory 91, and used to maintain location information about receipt receptacles in the system, so that the management module can locate receipt receptacles for future operations. The check-in operation 404 can also include a mobile drive unit 20 moving the case shuttle 32 loaded with receipt receptacles to an appropriate location within the workspace 70 of the inventory system 10, such as to a storage location, to a receiving station 50R and/or to a pick station 50P.

At 406, a "make pickable" operation is performed. Examples of receive stations 50R, 550R at which the make pickable operation 406 can be performed are described above with respect to FIG. 1 and below with respect to FIG. 10. In a make-pickable operation 406, inventory items 40 are transferred from case shuttles 32 to pickable inventory holders 34. A pickable inventory holder 34 can be any structure capable of storing inventory items 40 and/or inventory item receptacles so that individual inventory items 40 can be located and accessed for subsequent operations, such as picking items 40 for fulfilling orders processed by the inventory system 10. As one example, a pickable inventory holder 34 can be an inventory holder 30 with bins or other storage elements configured to hold inventory items 40 and/or receptacles of inventory items 40. To facilitate make-pickable operations 406, one or more case shuttles 32 can be brought to a single location with one or more pickable inventory holders 34. The inventory items 40 can be transferred from the case shuttles 32 to the pickable inventory holders 34 by various methods. In one method, the inventory items 40 are removed from the receipt receptacles and placed into storage elements of the pickable inventory holder 34. In another method, an entire receipt receptacle of known inventory items 40 is removed from a case shuttle 32 and placed onto the pickable inventory holder 34. The inventory items 40 can be moved from case shuttles 32 to pickable inventory holders 34 by operators or by automation. The make pickable operation at 406 may include moving the pickable inventory holder 34 via mobile drive unit 20 to an appropriate location within the workspace 70, such as to a storage location and/or to a pick station 50P.

In some embodiments, a check-in operation 404 may render a make pickable operation 406 unnecessary. For example, the structure and contents of a receipt receptacle may be such that the contents are immediately pickable upon completion of the check-in operation 404. As a first illustrative example, during the check-in operation 404, a pallet (i.e., a particular type of receipt receptacle) carrying identical items may be loaded on an inventory holder 30, rendering all the identical items locatable and accessible for subsequent operations (i.e., such that the pallet-bearing inventory holder 30 is a pickable inventory holder 34).

At 408, a "pick-to-order" operation can be performed. Examples of pick stations 50P and/or pick-to-order stations 550P at which the pick-to-order operation 408 can be performed are described above with respect to FIG. 1 and below with respect to FIG. 11. The pick-to-order operation can include one or more operators transferring items from a bin or other receptacle on a pickable inventory holder 34 (or from a receipt receptacle on a case shuttle 32) into order receptacles to compile orders of inventory items 40. The order receptacles can be any appropriate receptacle of a type described with respect to a receipt receptacle. To assemble an order before shipping, an operator picks one or more inventory items 40 from one or more case shuttles 32 or pickable inventory holders 34 and puts the picked items into an order receptacle. Each filled order receptacle represents a single order. As part of the pick-to-order operation 408, an operator can load one or more order receptacles into available open spaces on order shuttles 36. In embodiments, the order shuttles 36 can be inventory holders 30 configured to receive and organize order receptacles, e.g., completed order receptacles. After the order shuttle 36 has been loaded with order receptacles, the pick-to-order operation can include using a mobile drive unit 20 to move an order shuttle 36 to an appropriate location in the workspace 70, such as to a storage location and/or to a ship station 50S.

At 410, a "ship operation" can be performed. Examples of ship stations 50S, 550S at which the ship operation 410 can be performed are described above with respect to FIG. 1 and below with respect to FIG. 12. The ship operation can include transferring order receptacles from order shuttles 36 into a truck or other shipping vehicle via mechanical automation and/or via actions performed by one or more operators. The ship operation at 410 can include using a mobile drive unit 520 to move an order shuttle to an appropriate location in a workspace 70 after order receptacles have been removed from the order shuttle 36 such as to a storage location and/or back to a pick-to-order station 50P for subsequent reloading with order receptacles.

At 412, a delivery vehicle with order receptacles can leave the workspace 70 and carry the order receptacles to destinations associated with orders received by the inventory system 10.

Inventory items 40 may be characterized by the management module 15 according to different states during the process 400. For example, the inventory items 40 may be grouped together into receipt receptacles during a portion 414 of the process 400, such as from a time of delivery at 402 up through undergoing the make-pickable operation 406. In another portion 416 of the process 400, items may be organized on an item-specific basis, such as in a bin or receptacle of a pickable inventory holder 34 (or a case shuttle 32), in which the inventory items 40 may be accessed independently of receipt receptacles. In another portion 418 of the process 400, items may be organized according to order receptacles, which may correspond to orders of multiple distinct inventory items processed by the inventory system 10. Sorting inventory items according to a receipt receptacle basis, an item specific basis, and/or an order receptacle basis can focus the process 400 and reduce a number of operator touches that may be needed otherwise to process inventory items 40 in the inventory system 10. In some embodiments, the process 400 can facilitate additional opportunities for automated sortation of inventory items 40, which may lead to additional efficiencies of the inventory system 10.

Figure 8:
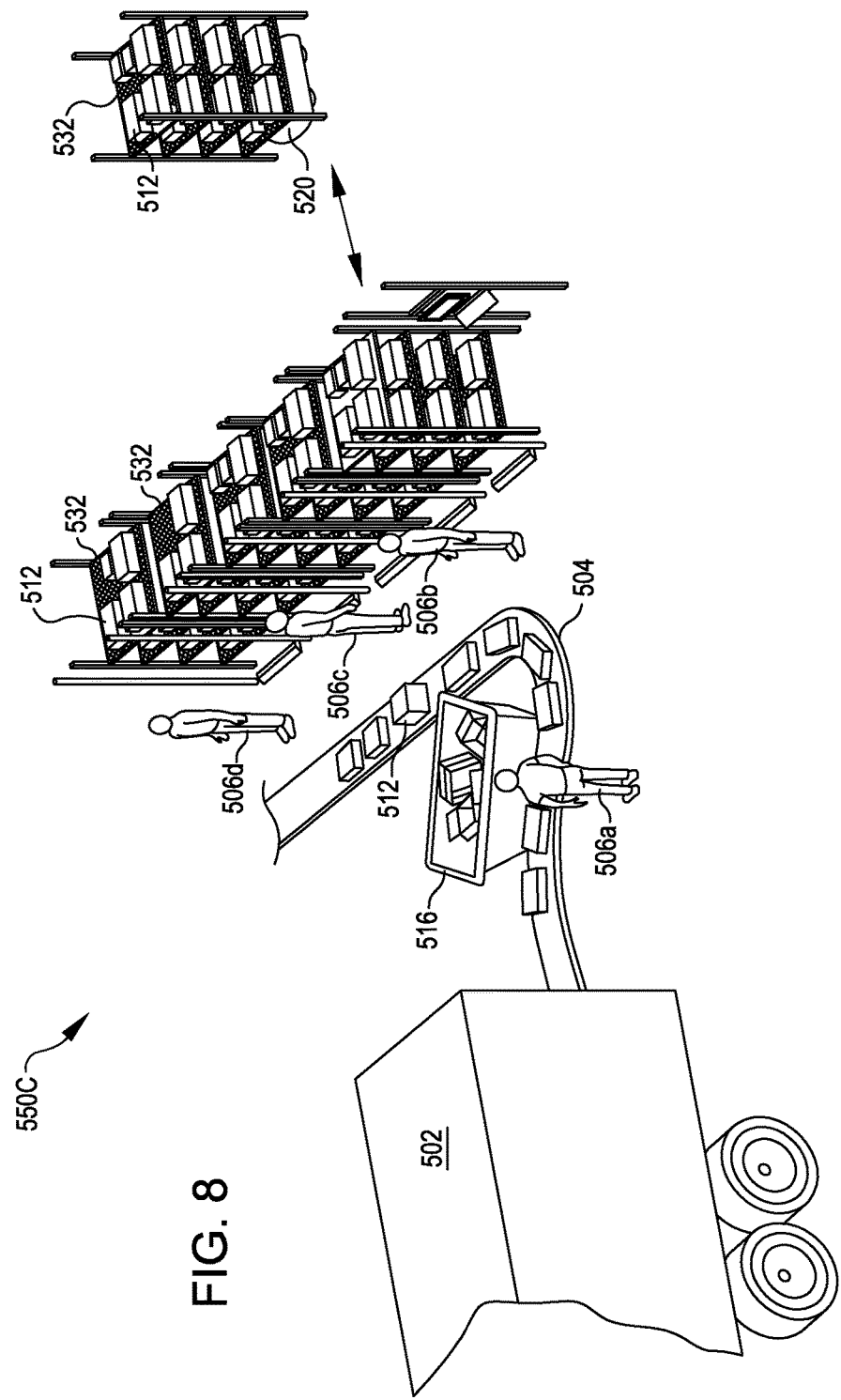
FIG. 8 illustrates a perspective view of an example check-in station according to a particular embodiment.

FIG. 8 is a perspective view of an example check-in station 550C according to a particular embodiment. In some embodiments, the check-in station 550C may correspond to the check-in station 50C of FIG. 1 and/or facilitate the check-in operation 404 of FIG. 7. The check-in station 550C can receive one or more delivery vehicles, e.g., a truck 502. A transfer mechanism, e.g., a conveyor 504, may be routed from the truck. Receipt receptacles 512 carrying inventory items 40 can be unloaded from the truck 502 by the conveyor 504. For example, a human or a machine (not shown) may load the receipt receptacles 512 on to the conveyor 504 from within the truck 502. As receipt receptacles move along the conveyor 504, a first operator 506A may open the receipt receptacles 512 and/or remove excess packaging into a trash receptacle 516. Additional operators (such as 506B, 506C and 506D) can transfer the receipt receptacles 512 from the conveyor 504 into open spaces on case shuttles 532 without any sortation of the receipt receptacles 512 or the inventory items contained therein. For example, operators 506B, 506C, 506D can transfer the receipt receptacles 512 into any open spaces on any available case shuttles 532 without any specific direction regarding such transfer. An identity of a receipt receptacle 512 can be determined and correlated with a position on a case shuttle 532 in which the receipt receptacle 512 is stored. In one illustrative example, an operator 506 may scan a barcode on a receipt receptacle 512 and scan a barcode on the case shuttle 532. In another example, a camera or other optical device may determine an identity of a receipt receptacle 512 and/or a corresponding storage position on a case shuttle 532 without intervention by the operator 506.

In some embodiments, the check-in station 550C is readily scalable to accommodate a different size or speed of a check-in operation. For example, additional operators 506 and/or case shuttles 532 can be added and/or removed from the check-in station 550C. In some aspects, the conveyor 504 can be extended to an adjacent check-in station 550C (not shown) in order to utilize operators and/or case shuttles 532 at both stations for a single check-in operation from a particular vehicle 502.

In some embodiments, a particular operator 506D can store a receipt receptacle 512 in any of the case shuttles 532 at the station 550C in which there is room for the receipt receptacle 512. In this manner, operators 506 may interact in a one-to-many or many-to-many relationship with the case shuttles 532. In some embodiments, in response to identification of a receipt receptacle 512 (such as through a bar code scan), the management module 15 can communicate to an operator 506 to place the identified receipt receptacle on a particular case shuttle 532 (such as by a message on a display, an activated indicator light, or a laser pointer aimed at a place on the case shuttle 532). Such an arrangement may allow incoming receipt receptacles 512 to be preliminarily sorted according to a plan of the management module 15, such as grouping together receipt receptacles 512 with unknown contents for later collective processing and/or distributing receipt receptacles 512 with known contents according to other useful groupings for later processing.

In some aspects, multiple features of the management module 15 can operate independently at the check-in station 550C. For example, each individual operator 506 may be associated with an individual module dedicated to identifying storage positions on a case shuttle 532 where the operator 506 is storing receipt receptacles 512. Such a module for one operator 506a may function independently of such a module for another operator 506b. In some aspects, the management module 15 has a module configured to determine how full a case shuttle 532 is and/or when to move a case shuttle 532 with a mobile drive unit 520. The module focused on the fullness of the case shuttle 532 may function independently of any of the modules focused on identifying storage positions of receptacles 512 on the case shuttles 532.

In some aspects, when a case shuttle 532 is ready to be carried away by a mobile drive unit 520, an operator 506 can be notified, such as by a sound from a speaker, an activated light, a message on a display, or a mobile drive unit 520 lifting the case shuttle 532. An instruction to the mobile drive unit 520 to remove the ready case shuttle 532 may be delayed until an operator authorizes the case shuttle 532 to be removed, such as by pressing a button on a touchscreen display or providing some other form of input.

In some embodiments, the check-in station 550C permits receipt receptacles 512 to be checked into the inventory system 10 without a human operator 506 sorting the contents of the receipt receptacle 512. Check in without operator sortation may permit sortation by the management module 15. For example, the management module 15 may determine a location in the workspace 70 to store a case shuttle 532 based on the receipt receptacles 512 carried by the case shuttle 532. For example, the management module may instruct a mobile drive unit 20 to move a case shuttle 532 to a particular floor (e.g., W, X, Y, or Z in FIG. 1) based on factors such as inventory items 40 known to be in receipt receptacles 512 carried by the case shuttle 532, inventory items known to be on the floor (e.g., X), inventory items 40 known to be on a different floor (e.g., W, Y, or Z), and/or stations 50 on the particular floor that are capable of processing inventory items 40 stored in the receipt receptacles 512. As illustrative examples, the management module 15 may send a first case shuttle 532 with receipt receptacles 512 having known inventory items 40 to a floor with a low supply of those inventory items 40, and send a case shuttle 532 with receipt receptacles 512 of unknown contents to a floor with a station having capacity to process unknown contents. In another illustrative example, the management module may distribute case shuttles 532 with receipt receptacles 512 of unknown contents across multiple floors, which may allow the unknown contents to be more quickly processed for utilization in the inventory system 10. In some embodiments, a check-in process without operator sortation may reduce an amount of time between an arrival of inventory items 40 to the inventory system 10 or workspace 70 and a confirmation that the arriving items 40 are available for subsequent operations in the inventory system 10, thereby increasing the responsiveness of the inventory system 10 as a whole.

Figure 9:
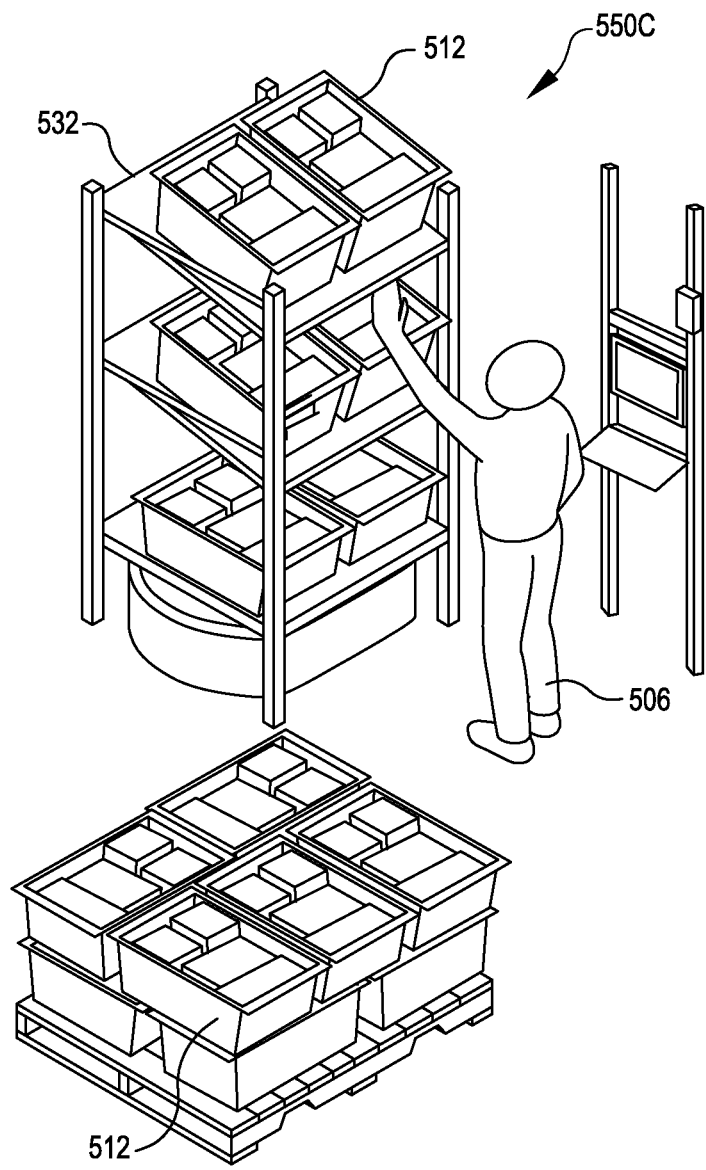
FIG. 9 illustrates another example of a check-in station according to a particular embodiment.

FIG. 9 illustrates another example of a check-in station 550C according to a particular embodiment. In some embodiments, the check-in station 550C may correspond to the check-in station 50C of FIG. 1 and/or be used in addition or as an alternative to the check-in station 550C of FIG. 8. In some embodiments, a shipment of receipt receptacles 512 arriving at the workspace 70 may include only receipt receptacles 512 with known contents. For example, the receipt receptacles 512 may have clear labeling identifying the contents and/or may already be indexed in memory 91 of the inventory system 10, such as if arriving from a related inventory system 10. At the check-in station 550C, the receipt receptacles 512 with known contents can be transferred directly to pickable inventory holders 534. For example, the pickable inventory holders 534 may be inventory holders 30 configured to hold the known receipt receptacles 512. The identity of a known receipt receptacle 512 and associated storage position on the pickable inventory holder 534 can be identified and correlated by the management module 15. Similar to the check in operation described with respect to FIG. 8, the receipt receptacles 512 with known contents of FIG. 9 may be transferred, without any sortation of the receipt receptacles 512 or the inventory items contained therein, to any open spaces on any available pickable inventory holders 534 without any specific direction regarding such transfer. Thus, the check-in station 550C may function to simultaneously perform the check-in operation 404 and the make-pickable operation 406 of FIG. 7 for groups of receipt receptacles 512 with known contents.

Figure 10:
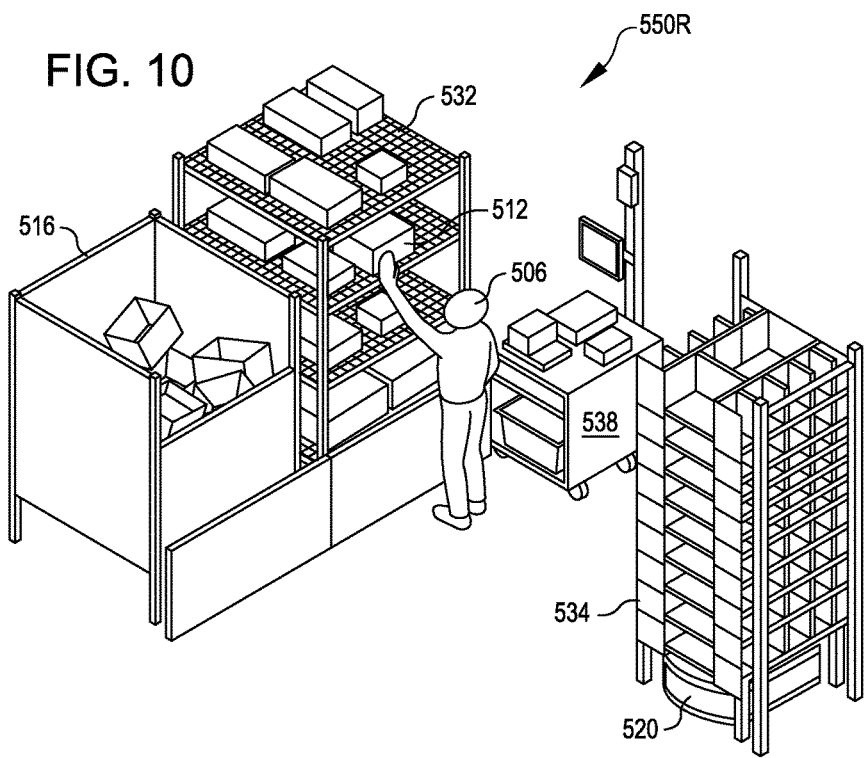
FIG. 10 illustrates a perspective view of an example of a receiving station in accordance with a particular embodiment.

FIG. 10 is a perspective view of an example of a receiving station 550R in accordance with a particular embodiment. For example, the station 550R may correspond to a station 50R of FIG. 1 and/or perform the make-pickable operation 406 of FIG. 7. A receipt receptacle 512 on a case shuttle 532 can be identified for an operator 506 to remove. The operator 506 can remove the receipt receptacle 512 from the case shuttle 532 and place the items 40 from the receipt receptacle into a pickable inventory holder 534. Items 40 stowed in the pickable inventory holder 534 are pickable for subsequent operations. The operator may stow all items 40 from a single receipt receptacle 512 into a single or multiple bins of a single or multiple pickable inventory holders 534. For example, mobile drive units 520 may bring and take pickable inventory holders 534 to and from the receive station 550R until a receipt receptacle 512 is emptied of items 40. The empty receipt receptacle 512 may be discarded in a trash receptacle 516 and/or otherwise appropriately disposed of.

In some aspects, an entire receipt receptacle 512 can be placed into a pickable inventory holder 534, and items 40 in the receipt receptacle 512 can be individually picked during subsequent operations. For example, transferring a receipt receptacle 512 with multiple items 40 of the same type into a pickable inventory holder 534 may be more efficient than individually loading the multiple items into the pickable inventory holder 534. A receipt receptacle 512 returning to the receiving station 550R after being emptied of items 40 by pick operations may be removed and disposed of, such as in the trash receptacle 516. In some aspects, a receipt receptacle 512 that is not entirely emptied can be removed from the pickable inventory holder 534 upon reaching a certain threshold of remaining items, and the remaining items 40 can be distributed into open spaces in pickable inventory holders 534. Removing a near empty receipt receptacle 512 may increase storage density by making room available on a pickable inventory holder for another receipt receptacle 512 with a greater number of items.

The trash receptacle 516 may be shared between different stations. In some embodiments, the stations may be on different floors. For example, one receiving station 550R on a first level may include a trash chute to move trash to a trash receptacle 516 of a check-in station 550C or another receiving station 550R on another level. In some embodiments trash receptacles 516 may be moved between floors, such as to reach a trash dumper in communication with the outside of the building.

In some embodiments, the receive station 550R includes a cart 538 or other working surface upon which the operator 506 can place a receptacle 512 for unloading items 40 out of the receipt receptacle 512. In some embodiments, an operator 506 may pull multiple receipt receptacles 512 from one or more case shuttles 532 before unloading items 40 from the receipt receptacles 512 into the pickable inventory holders 534. For example, mobile drive units 520 may bring a series of case shuttles 532 having specific receipt receptacles 512 to be pulled by the operator 506.

Use of case shuttles 532 at the receiving station 550R can facilitate a number of other features. For example, receipt receptacles 512 carried by the case shuttles 532 can be processed at the receive station 550R in a different order than an order in which the receipt receptacles 512 were checked in, such as at a station 550C and/or at operation 404 of FIG. 7. In one illustrative example, if an ordered inventory item 40 is known to be in a particular receipt receptacle 512, a case shuttle 532 may be advanced out of sequence in order to make the item 40 pickable and expedite the process of moving the item 40 through the inventory system 10. In a similar example, a case shuttle 532 may be advanced out of sequence to make an item 40 pickable based on a popularity of the item 40, such as if the item is frequently ordered though no outstanding orders for the item 40 are pending. Conversely, if an inventory item 40 is not requested as part of a current order or is not likely to be ordered or requested in the near future, the make pickable operation 406 for the case shuttle 532 containing the receipt receptacle 512 with the particular inventory item 40 may be delayed until the particular inventory item 40 is ordered or otherwise requested, thereby facilitating efficient processing of current or likely future orders or requests for items. In another illustrative example, the management module can select case shuttles 532 to bring to a receive station 550R and/or receipt receptacles 512 to be removed at the receive station 550R based on a size of inventory items 40 in the receipt receptacles 512. For example, the management module 15 may prompt an operator 506 to process a series of receipt receptacles 512 having items 40 of a similar size, which may reduce a number of pickable inventory holders 534 with different sized bins, openings, or other receptacles needed to store the stowed items 40. In another example, case shuttles 532 are brought to a receive station 550R based on a speed at which an operator 506 of the receive station 550R is stowing items from receipt receptacles 512 into pickable inventory holders 534. For example, a management module 15 may prompt a mobile drive unit 520 to bring another case shuttle 532 to a receive station 550R just before an operator 506 runs out of items that he is stowing from another receipt receptacle 512. In yet another example, a sequence of receipt receptacles 512 brought to the receive station 550R by case shuttles 532 can be determined based on a length of time that the receipt receptacle 512 has been checked in. For example, a management module may prioritize receipt receptacles that are older or have been checked in for a longer period of time. In some aspects, the sequence determination may also be determined based on distance of a case shuttle 532 to a receive station 550R. In some aspects, receipt receptacles 512 with unknown contents are prioritized. For example, prioritizing unknown inventory may reduce an amount of time that inventory items 40 may be present in the inventory system 10 without being operable in the inventory system 10. In some aspects, receipt receptacles 512 with items 40 that need special preparation are prioritized. For example, fragile items 40 that are to specially packaged, items 40 that are to be giftwrapped, and/or items 40 that are to receive specialized labeling may be directed to a station having the supplies for such actions. In some embodiments, a tiered prioritization may be implemented. For example, the management module 15 may prioritize case shuttles 532 containing known inventory items 40 that are the subject of existing orders over case shuttles 532 containing unknown inventory items 40, and prioritize unknown inventory items over known inventory items 40 that are not yet the subject of existing orders.

In embodiments, the management module 15 may assign a receipt receptacle 512 (and/or a case shuttle 532 bearing the receipt receptacle) to a particular floor (e.g., W, X, Y, or Z) based on information about the floor and/or information about the receipt receptacle 512. For example, a case shuttle 532 may be assigned to a particular floor based on that floor being preferred for fulfilling orders for items contained in a receipt receptacle 512 on the case shuttle 532. As another example, a receipt receptacle 512 may be assigned to a particular floor based on items in the receipt receptacle 512 being frequently requested in conjunction with other items on the floor. As an illustrative example, a receipt receptacle 512 with a jar of peanut butter may be assigned to a floor that has a jar of jelly stored in a pickable inventory holder 534 or in a case shuttle 532. As a further example, a receipt receptacle 512 may be assigned to a particular floor based on items in the receipt receptacle 512 being of a size that can be accommodated in appropriately sized storage space on that floor. In yet another example, a receipt receptacle 512 may be assigned to a particular floor to improve a likelihood that a sufficient amount of receipt receptacles 512 are available on that floor to occupy operators 506 tasked with processing receipt receptacles. In an additional example, a receipt receptacle 512 may be assigned to a particular floor to improve a balance of items across the floors, such as if the receipt receptacle 512 contains an item that is more prevalent on other floors than on the assigned floor.

Figure 11:
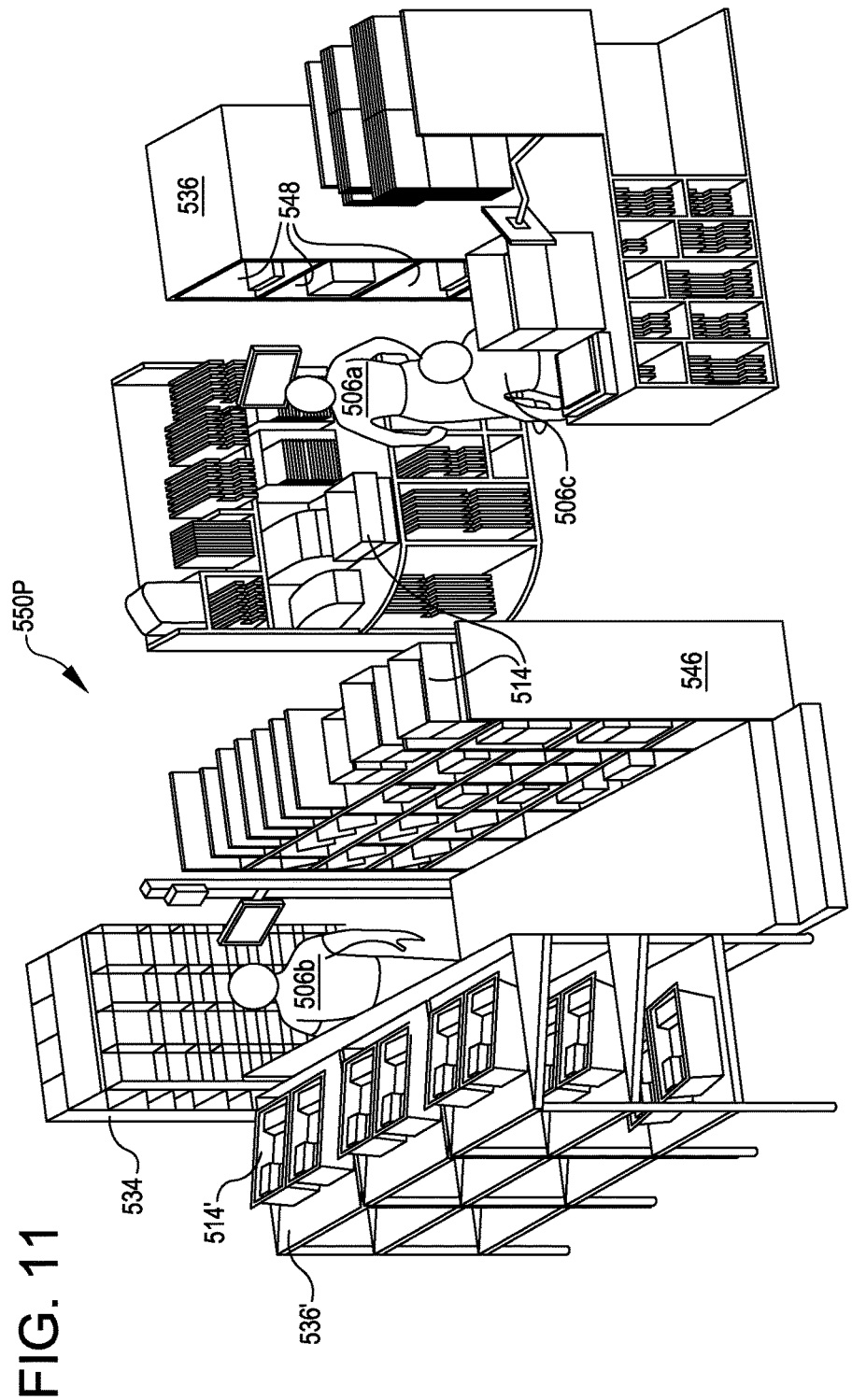
FIG. 11 illustrates a perspective view of an example of a pick-to-order station in accordance with a particular embodiment.

FIG. 11 is a perspective view of an example of a pick-to-order station 550P in accordance with a particular embodiment. For example, the pick-to-order station 550P can correspond to a pick station 50P of FIG. 1 and/or facilitate the pick-to-order operation at 408 in FIG. 7. The pick-to-order station 550P can facilitate transfer of pickable items 40 into order receptacles 514. The pick-to-order station 550P can include multiple operators 506A, 506B, 506C to facilitate the pick-to-order operation. The operators 506A, 506B, 506C can be organized on either side of a partition 546, which may be a wall or any other structure capable of dividing or separating adjacent spaces. Although FIG. 11 shows three operators 506A, 506B, and 506C organized on either side of a partition 546, any suitable number of operators can be used. In some embodiments, the number of operators on a first side of the partition 546 (e.g., on the side depicted toward the right of FIG. 11) is determined based on a speed at which one or more operators on a second, opposite side of the partition can complete tasks.

Any operator 506A, 506C on the first side of the partition can prepare order receptacles 514. For example, an order receptacle 514 may be prepared based on a number and/or size of items 40 in an order, such as preparing padded envelopes for small single items and/or preparing larger boxes for larger and/or multiple items. The order receptacles 514 can be placed into openings, compartments, or positions in the partition 546. An operator 506B on an opposite side of the partition can remove pickable items 40 from a pickable inventory holder 534 and place each item 40 in an order receptacle designated for the item 40. For example, the management module may indicate an item 40 to be taken from the pickable inventory holder 534 and an order receptacle 514 in which the item is to be placed. Any operator 506A, 506C on the first side of the partition may be instructed by the management module to remove order receptacles 514 from the partition when the order receptacle 514 includes all of the items of an order. Any operator 506A, 506C on the first side of the partition may perform appropriate actions for transforming the order receptacle 514 with all items of an order into a completed order receptacle 514, e.g., so that the order receptacle 514 is ready for shipment or other transfer out of the workspace 70. Such actions may include adding dunnage or other appropriate packing materials to the order receptacle 514, adding packing slips to the order receptacle 514, taping or otherwise sealing the order receptacle 514, weighing the order receptacle 514, and/or adding labels (e.g., shipping labels, which may reflect a weight obtained by weighing the order receptacle 514) to the order receptacle 514. An order receptacle 514 including all of the items of an order (e.g., a completed order receptacle 514) can be placed on an order shuttle 536, such as by an operator 506A, 506C on a first side of the partition at the instruction of the management module 15. For example, the order shuttle 536 may include different spaces 548 corresponding to different groups of destinations for the orders.

The coordinated actions of the operators 506A-506C at the pick-to-order station 550P enable picking of items by one operator directly into order receptacles prepared and completed by at least one other operator, thereby eliminating any additional conveyance, transfer and/or touches and additional intermediate operations and/or stations to create completed order receptacles.

In some embodiments, the management module 15 provides instructions for directing activity of the operators 506A, 506B on the first side of the partition. For example, the management module 15 can instruct an operator 506a to assemble and/or otherwise prepare an order receptacle 514 for items 40 of a specific order. The management module 15 can instruct that the prepared order receptacle 514 be placed at a particular opening, compartment, or position within the partition 546. For example, the management module 15 may select a particular opening, compartment, or position for an order receptacle 514 based on factors such as a priority of the order, a size of the opening, compartment, or position relative to a size of the receipt receptacle 514, time costs for an operator 506A on a first side of the partition to travel to the particular opening, compartment, or position to load the receptacle 514 into the partition (e.g., including any time losses from navigating around another operator 506C interacting with the same side of the partition 546), time costs for an operator 506B on the opposite side of the partition 546 to travel to the particular opening, compartment, or position to place an ordered item 40 in the order receptacle 514 (e.g., distance from a pickable inventory holder 534 to the particular opening, compartment, or position), and/or time costs for an operator 506A or 506C on a first side of the partition to travel to the particular opening, compartment, or position to remove the order receptacle when all items 40 of the order have been loaded into the order receptacle.

In some embodiments, the management module 15 can provide instructions that determine timing and/or sequencing of activity of the operators 506A, 506C on the first side of the partition. The management module 15 can provide instructions so that actions relating to a high priority receipt receptacle 514 happen before actions relating to a lower priority receipt receptacle 514. As one example, the management module 15 may prioritize actions of removing a receipt receptacle 514 designated for an order shuttle 536 that is at the pick-to-order station 550P ahead of removing a receipt receptacle 514 for an order shuttle 536 that has not yet arrived to the pick-to-order station 550P. As a further example, the management module 15 can provide instructions to prioritize removing a specific receipt receptacle 514 before or after adding a different receipt receptacle into the partition 546. In an illustrative example, adding a new receipt receptacle 514 designated to receive an item 40 from a pickable inventory holder 534 that is at or approaching the pick-to-order station 550P may be prioritized before removing a receipt receptacle 514 for an order designated for an order shuttle 536 at the pick-to-order station 550P. In another illustrative example, removing a receipt receptacle 514 designated for a particular order shuttle 536 already at the pick-to-order station 550P may be prioritized before adding a new receipt receptacle 514 for an order designated for an order shuttle 536 that has not yet arrived to the pick-to-order station 550P. Actions may be prioritized based on the effect of the actions on completing order shuttles 536 and/or on processing items 40 from pickable inventory holders 534.

In some embodiments, the pick-to-order station 550P can also utilize alternate order shuttles 536'. For example, the alternate order shuttles 536' may be configured for containing alternate order receptacles 514'.

In some embodiments, the alternate order receptacles 514' may include order receptacles bound for another level (e.g., W, X, Y, or Z) of the inventory system 10 and/or another inventory system 10. The second operator 506B can be instructed to move items 40 from the pickable inventory holder 534 to alternate order receptacles 514' on the alternate order shuttles 536'. In some aspects, the alternate order receptacles 514 may become the receive receptacles 512 with known contents for another inventory system 10.

In some embodiments, the alternate order shuttles 536' may be assigned to a particular floor of the inventory system for moving inventory items to a particular floor from the floor on which the pick-to-order station 550P is situated. In an illustrative example, an alternate order receptacle 514' is provided for each of the other levels (e.g., W, X, and Y if the pick-to-order station 550R is on level Z) and is moved or carried to that other level by a mobile drive unit 520 when the alternate order receptacle 514' reaches a threshold capacity of items 40 and/or when a mobile drive unit 520 bound for that level reaches the alternate order receptacle 514'. In some aspects, a filled alternate order receptacle 514' may be transferred to an alternate order shuttle 536' brought to the station by a mobile drive unit 520 en route to another floor. In some aspects, a mobile drive unit 520 may pick up an alternate order shuttle 536' bearing an alternate order receptacle 514' and take the combination to another floor.

In some embodiments, the management module may determine a pick-to-order station 50P on one of the floors (e.g., W, X, Y, or Z) to fulfill an order from items 40 distributed across multiple floors. The management module 15 may determine which floor has the greatest number of inventory items for the order. For example, the management system may assign an order to a floor that has four out of five inventory items for an order rather than a floor that only has three out of five inventory items for an order. A management module 15 may create one or more inter-floor orders to move the missing inventory items to the selected floor. The management module 15 may instruct a shuttle to delay moving to another floor until the shuttle is filled with items for that other floor. The item 40 transferred between floors may be picked from the shuttle by the operator 506B and combined with other items picked from shuttles on the floor into order receptacles.

In some aspects, distribution of products provided by storing case shuttles 532 on a particular floor can reduce an amount of inter-floor transfers that are needed to complete orders. In some embodiments, inter-floor transfers can also be performed to balance distribution of inventory across multiple floors instead of, or in addition to, inter-floor transfers for fulfilling an order. As an illustrative example, an inter-floor transfer from floor Z to floor X in FIG. 1 may include a red t-shirt needed to complete an order at the pick station 50P on floor X. Three of six total blue t-shirts stored on floor Z may be sent in the inter-floor transfer with the red t-shirt so that the pick stations 50P on floor X and floor Z will equally be able to handle any future orders for a blue t-shirt without conducting extra inter-floor transfers. In some aspects, an inter-floor transfer may include moving an entire shuttle in order to get an item on that shuttle. In some aspects, the inter-floor transfer involves transferring a desired item from one shuttle to a collecting shuttle to move to the other floor with other collected items from the source floor.

Figure 12:
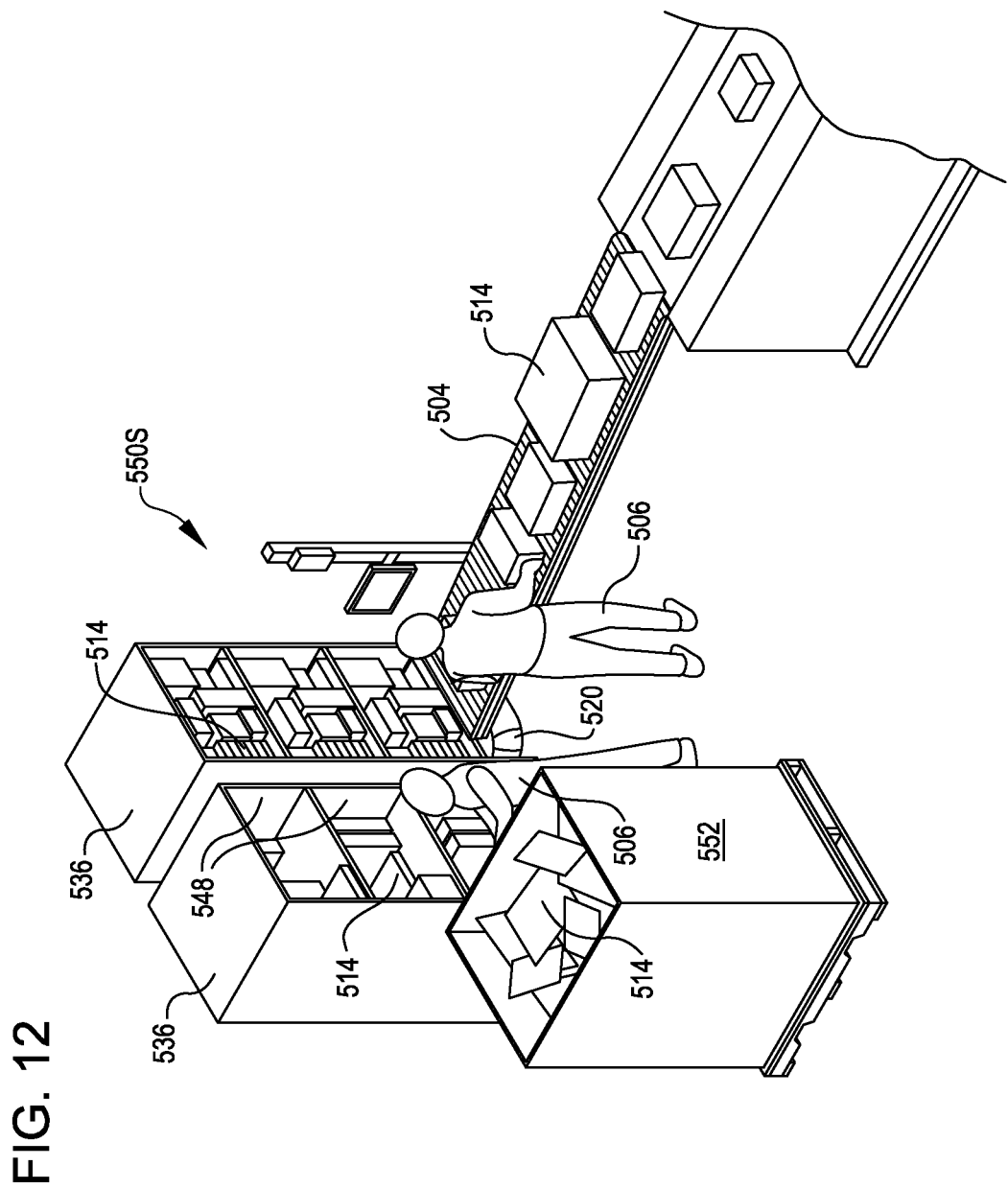
FIG. 12 illustrates a perspective view of an example of a ship station in accordance with a particular embodiment.

FIG. 12 illustrates a perspective view of an example of a ship station 550S in accordance with a particular embodiment. In some embodiments, the ship station 550S may correspond to a ship station 50S of FIG. 1 and/or facilitate the ship operation 410 of FIG. 7. Order shuttles 536 bearing order receptacles 514 can be sent to the ship station 550S using mobile drive units 20. Operators 506 can be instructed as to which spaces 548 are to be emptied at the ship station 550S (e.g., that correspond to a particular truck). In some embodiments, large order receptacles 514 can be placed on a conveyor 504 and small order receptacles 514 can be consolidated into shipping receptacles 552 for transfer onto a truck or other delivery vehicle. In some embodiments, an order shuttle 536 can be moved away from the shipping station 550S when a space 548 corresponding to a truck at the station 550S is emptied. The order shuttle 536 can be stored until a truck for order receptacles 514 of another space 548 of the order shuttle 536 has arrived to the same or a different shipping station 550S. Such an arrangement may permit any finished order to be accessed upon a specific triggering event, such as the arrival of a transportation vehicle for conveying the order receptacle 514 to its ultimate destination.

Figure 13:
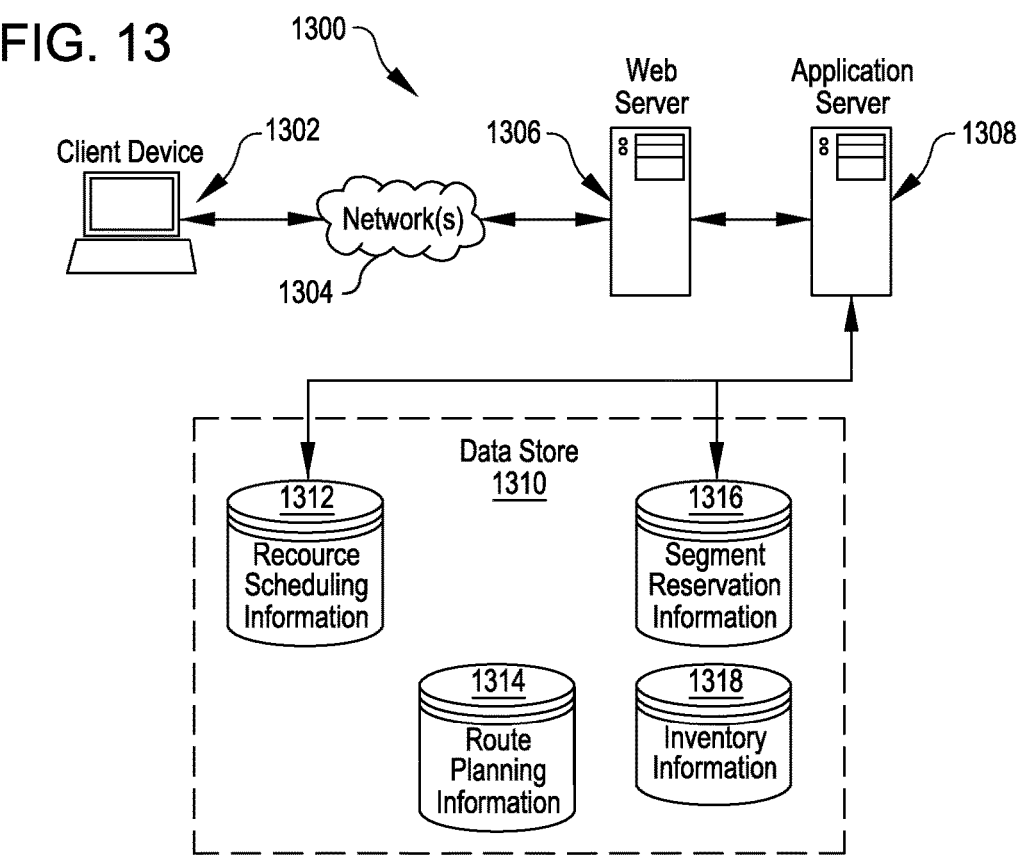
FIG. 13 illustrates an environment in which various features of the inventory system can be implemented, in accordance with at least one embodiment.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as resource scheduling information 1312, route planning information 1314, segment reservation information 1316, and/or inventory information 1318. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   a plurality of mobile drive units configured to traverse a plurality of floors, the plurality of floors disposed vertically relative to each other, each floor comprising a plurality of inventory items and a pick station, and each floor configured to operate substantially independently of other floors;
   a check-in station configured to receive receipt receptacles of inventory items for each of the plurality of floors;
   a ship station configured to receive order receptacles of inventory items from each of the plurality of floors; and
   a management module configured to:
      assign an order for a set of inventory items to one of the plurality of floors based at least in part on a relative match between the plurality of inventory items of each floor and the set of inventory items of the order;
      identify an item from the set of inventory items that is not available on the assigned floor but is available on another floor; and
      instruct a mobile drive unit to move the item to the assigned floor from the other floor to be picked at the pick station on the assigned floor.

2. The inventory system of claim 1, wherein the management module is further configured to instruct the mobile drive unit to move a receptacle having items for multiple orders assigned to the assigned floor and move the receptacle from the other floor to the assigned floor for the multiple orders.

3. The inventory system of claim 1, wherein the management module being configured to instruct a mobile drive unit to move the item to the assigned floor from the other floor to be picked at the pick station on the assigned floor comprises the management module being configured to instruct the mobile drive unit to dock with a shuttle containing the item.

4. The inventory system of claim 3, wherein the management module is further configured to instruct a mobile drive unit to drop off the shuttle at a pick station of the other floor for receiving the item to be moved to the assigned floor.

5. The inventory system of claim 1, wherein the management module being configured to instruct a mobile drive unit to move the item to the assigned floor from the other floor to be picked at the pick station on the assigned floor comprises the management module being configured to instruct the mobile drive unit to transport a shuttle to a location for transfer of the item to the shuttle and to the assigned floor.

6. A non-transitory computer-readable medium having computer-executable instructions stored thereon, wherein the instructions, when executed, cause a computer system having at least one computer processor to perform a method comprising:
   instructing movement of a plurality of receipt receptacles from a shipping vehicle to a plurality of case shuttles without separating or sorting inventory items contained in the receipt receptacles;
   for each receipt receptacle of the plurality of receipt receptacles, obtaining information regarding inventory items contained in the receipt receptacle;
   assigning a particular receipt receptacle to a floor of an inventory system based at least in part on information about the floor of the inventory system and the obtained information regarding inventory items contained in the particular receipt receptacle, the inventory system comprising a plurality of floors disposed vertically relative to each other, and each floor configured to operate substantially independently of other floors; and
   instructing movement, using a mobile drive unit, of the case shuttle bearing the particular receipt receptacle to a storage location on the floor to which the particular receipt receptacle is assigned.

7. The non-transitory computer-readable medium of claim 6, wherein the method further comprises:
   receiving an order requesting at least one inventory item; and
   determining a preferred floor for the fulfilling the order;
   wherein assigning a particular receipt receptacle to a floor of an inventory system based at least in part on information about the floor and the obtained information regarding inventory items contained in the particular receipt receptacle comprises assigning the particular receipt receptacle to the preferred floor based at least in part on a presence, in the particular receipt receptacle, of at least one inventory item requested in the order associated with the preferred floor.

8. The non-transitory computer-readable medium of claim 6, wherein the method further comprises:
   determining that a particular floor has less of a certain type of item than other floors; and
   wherein assigning a particular receipt receptacle to a floor of an inventory system based at least in part on information about the floor and the obtained information regarding inventory items contained in the particular receipt receptacle comprises assigning the particular receipt receptacle to the particular floor based at least in part on a presence, in the particular receipt receptacle, of an inventory item of the certain type.

9. The non-transitory computer-readable medium of claim 6, wherein assigning a particular receipt receptacle to a floor of an inventory system based at least in part on information about the floor and the obtained information regarding inventory items contained in the particular receipt receptacle comprises assigning the particular receipt receptacle to a floor based at least in part on a size of an inventory item in the particular receipt receptacle and appropriately sized storage space to accommodate the inventory item on the assigned floor.

10. The non-transitory computer-readable medium of claim 6, wherein assigning a particular receipt receptacle to a floor of an inventory system based at least in part on information about the floor and the obtained information regarding inventory items contained in the particular receipt receptacle comprises assigning the particular receipt receptacle to a floor based at least in part on an availability of the particular receipt receptacle to arrive for processing on the floor before operators on the floor are expected to finish processing a supply of other receipt receptacles.

11. The non-transitory computer-readable medium of claim 6, wherein assigning a particular receipt receptacle to a floor of an inventory system based at least in part on information about the floor and the obtained information regarding inventory items contained in the particular receipt receptacle comprises assigning the particular receipt receptacle to a floor based at least in part on a time that the particular receipt receptacle was moved to a case shuttle relative to another receipt receptacle.

12. The non-transitory computer-readable medium of claim 6, wherein assigning a particular receipt receptacle to a floor of an inventory system based at least in part on information about the floor and the obtained information regarding inventory items contained in the particular receipt receptacle comprises assigning the particular receipt receptacle to a floor based at least in part on a proximity of a storage location for the particular receipt receptacle to a receiving station on the floor.

13. The non-transitory computer-readable medium of claim 6, wherein assigning a particular receipt receptacle to a floor of an inventory system based at least in part on information about the floor and the obtained information regarding inventory items contained in the particular receipt receptacle comprises assigning the particular receipt receptacle to a floor based at least in part on a frequency of orders comprising an inventory item in the particular receipt receptacle and at least one other inventory item stored on the floor.

14. The non-transitory computer-readable medium of claim 6, wherein assigning a particular receipt receptacle to a floor of an inventory system based at least in part on information about the floor and the obtained information regarding inventory items contained in the particular receipt receptacle comprises assigning the particular receipt receptacle to a floor based at least in part on (a) designations for giftwrapping, additional packaging, additional labeling, and/or processing as an unknown item for an inventory item in the particular receipt receptacle and (b) a presence of a station on the floor configured to handle inventory items with such designations.

15. An inventory management system, comprising:
a plurality of mobile drive units configured to traverse a plurality of floors, the plurality of floors disposed vertically relative to each other, each floor comprising a plurality of inventory items, and each floor configured to operate substantially independently of other floors; and
a management module configured to instruct a mobile drive unit to move at least one inventory item of a first type to storage on a first floor from storage on another floor so as to balance a supply of inventory items of the first type among the plurality of floors, wherein the management module is further configured to delay instructing the mobile drive unit to move until a receptacle to be moved by the mobile drive unit is filled with inventory items for the first floor.

16. The inventory system of claim 15, wherein the management module being configured to instruct the mobile drive unit to move at least one inventory item of the first type to the first floor from another floor comprises the management module being configured to instruct the mobile drive unit to dock with a shuttle carrying the inventory item of the first type.

17. The inventory system of claim 15, wherein the management module being configured to instruct the mobile drive unit to move at least one inventory item of the first type to the first floor from another floor comprises the management module being configured to instruct the mobile drive unit to transport a shuttle to a location for transfer of the inventory item of the first type to the shuttle and to the first floor.

18. The inventory system of claim 15, further comprising a check-in station configured to receive receipt receptacles of inventory items for each of the plurality of floors, wherein the management module is further configured to instruct a mobile drive unit to move at least one inventory item of the first type from the check-in station to the first floor so as to balance the supply of inventory items of the first type among the plurality of floors.

19. The inventory system of claim 18, wherein the management module is further configured to instruct a mobile drive unit to move an inventory item of the first type from the check-in station to another floor so as to balance the supply of inventory items of the first type among the plurality of floors.

\* \* \* \* \*